Figure 1:
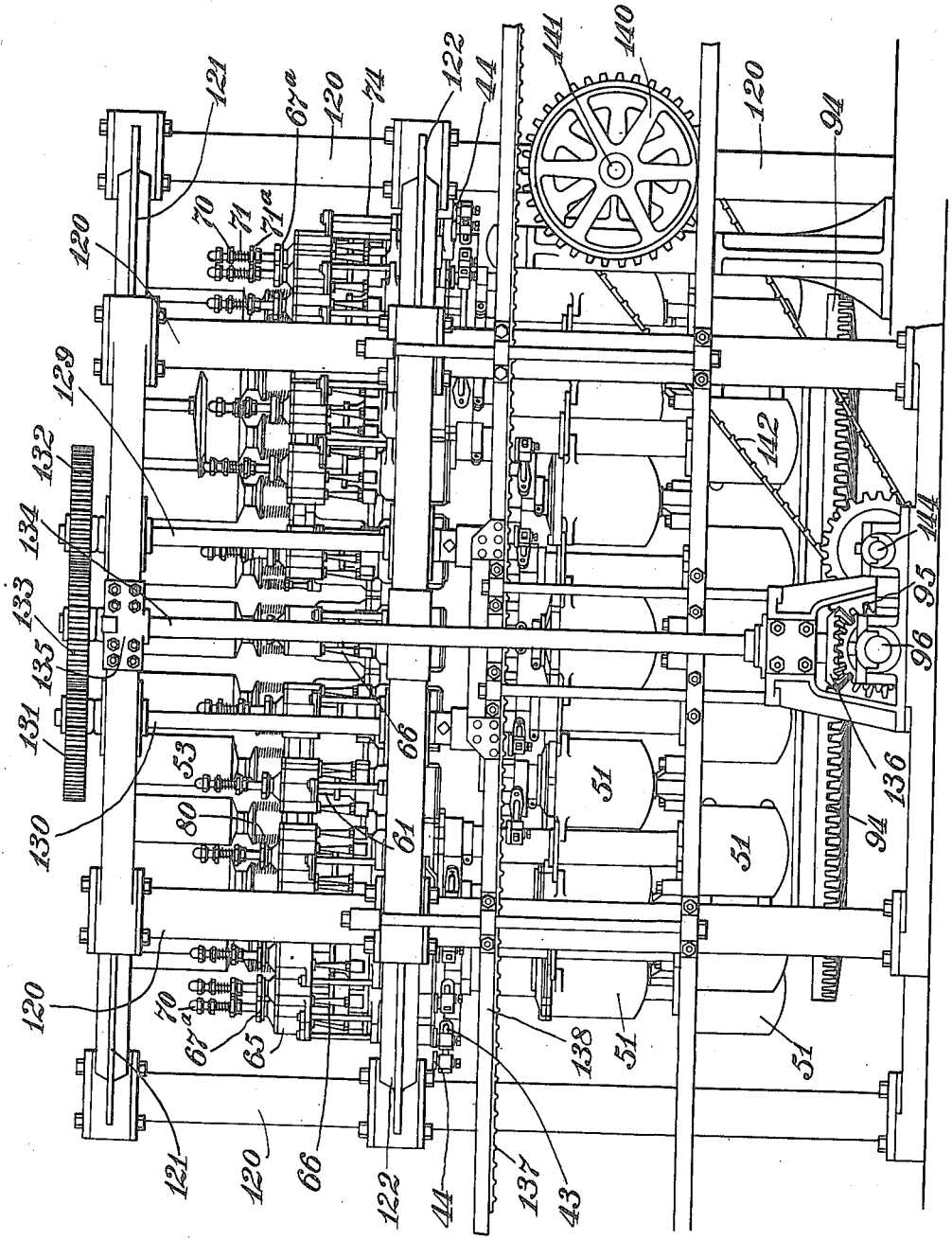

W. B. FENN.
PROCESS OF STERILIZING ORGANIC MATERIAL.
APPLICATION FILED OCT. 3, 1911.

1,141,242.

Patented June 1, 1915.
12 SHEETS—SHEET 1.

Witnesses
Benj. Finckel
Mayme Goard

Inventor
William B. Fenn
by Finckel & Finckel
his Attorneys

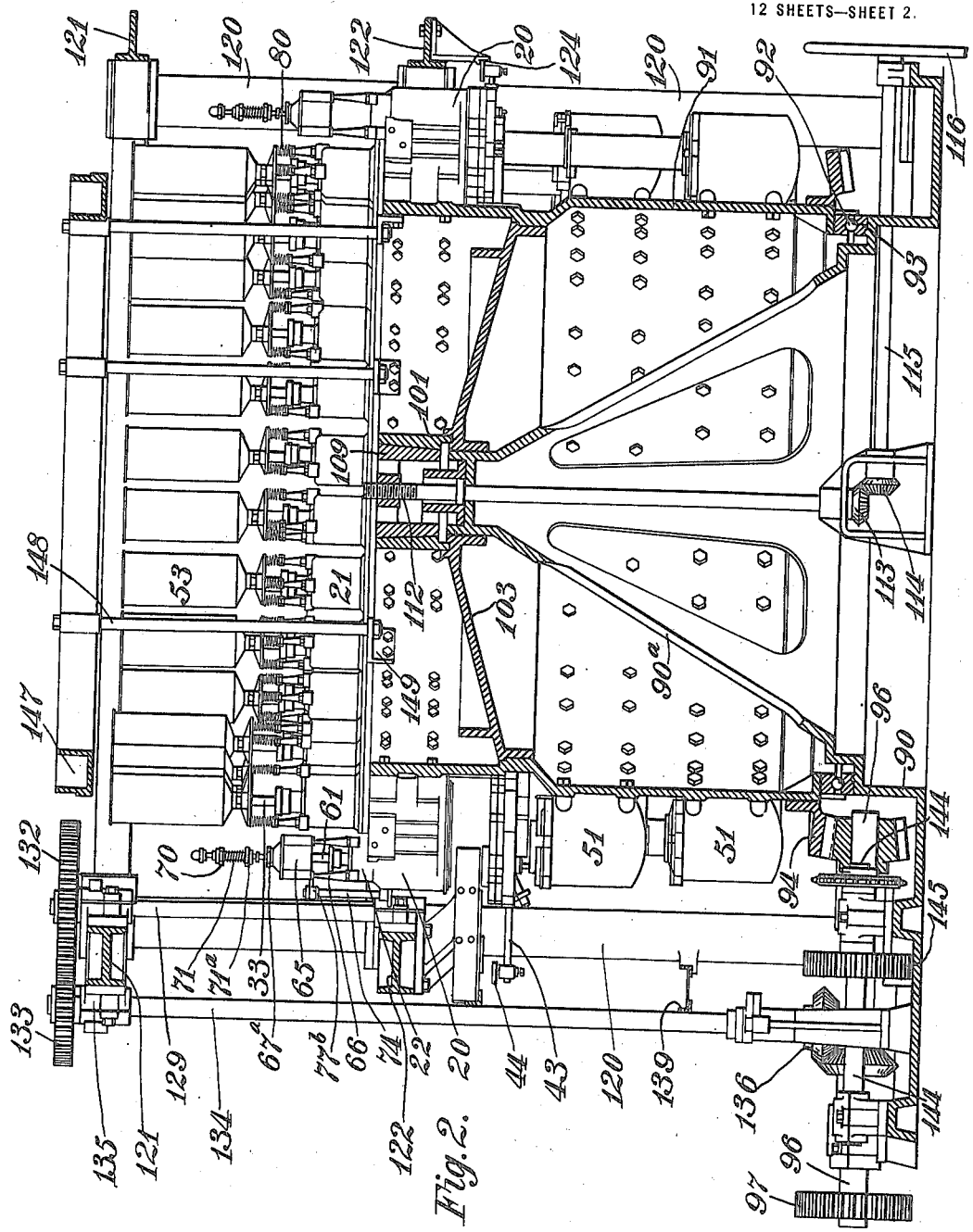

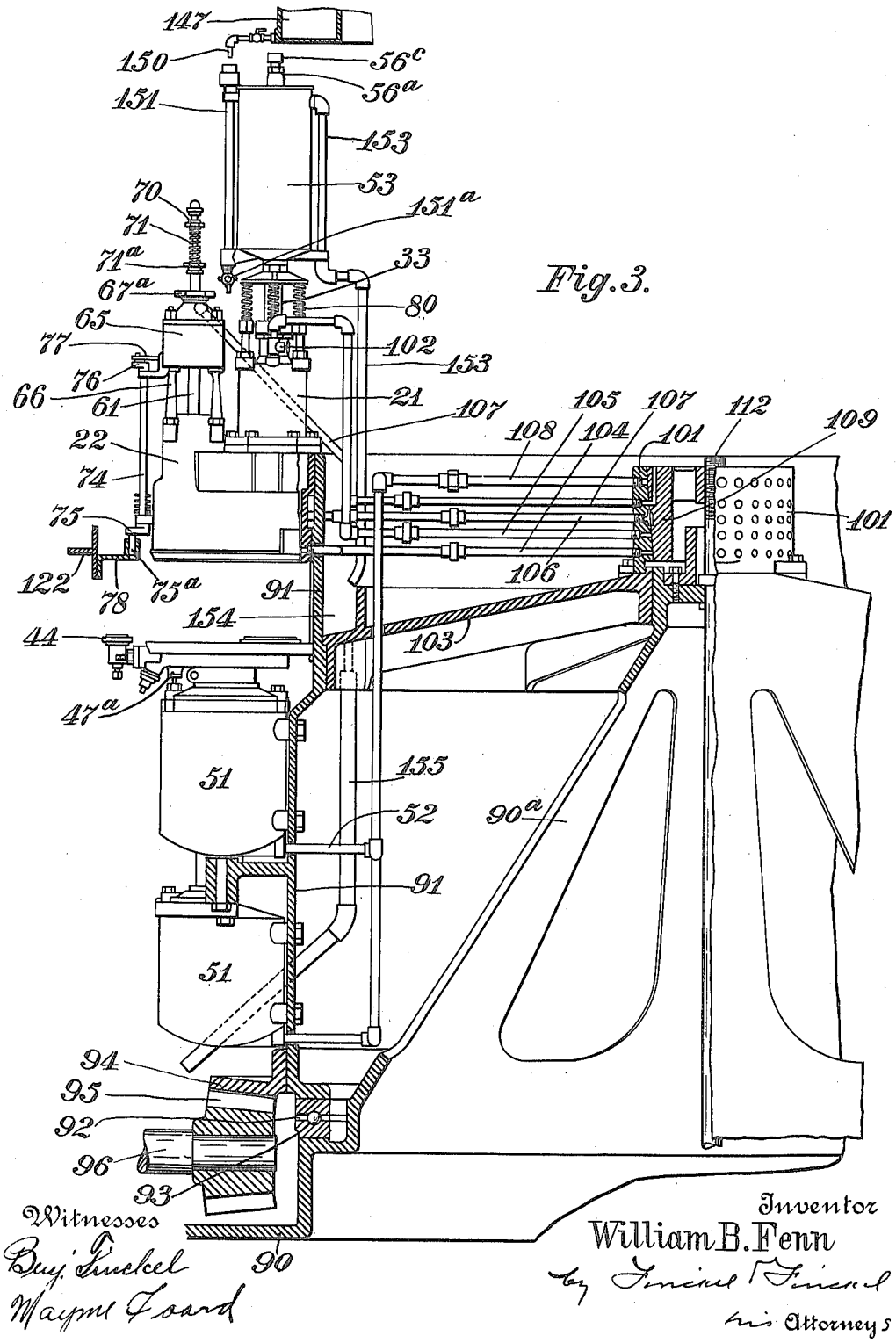

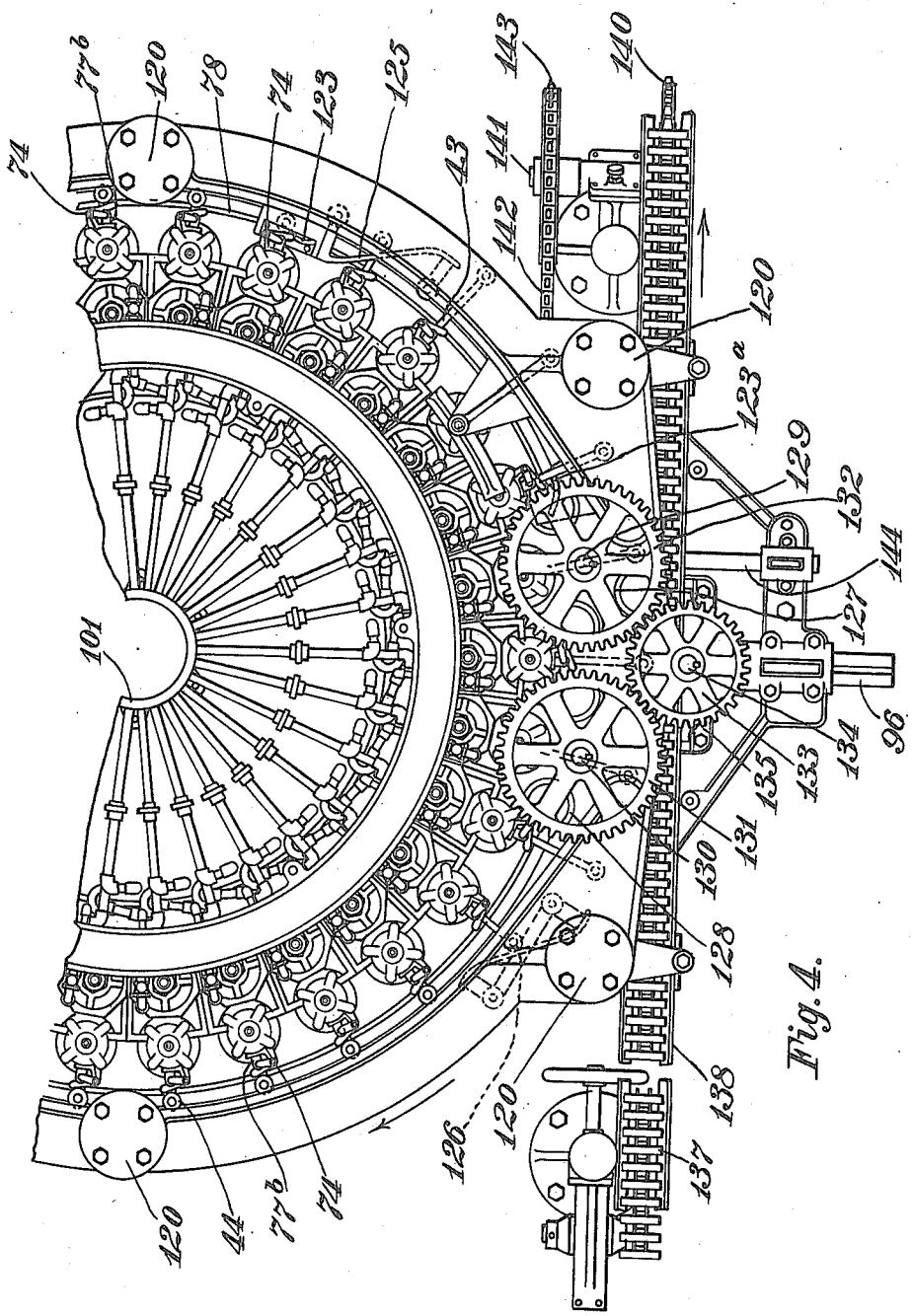

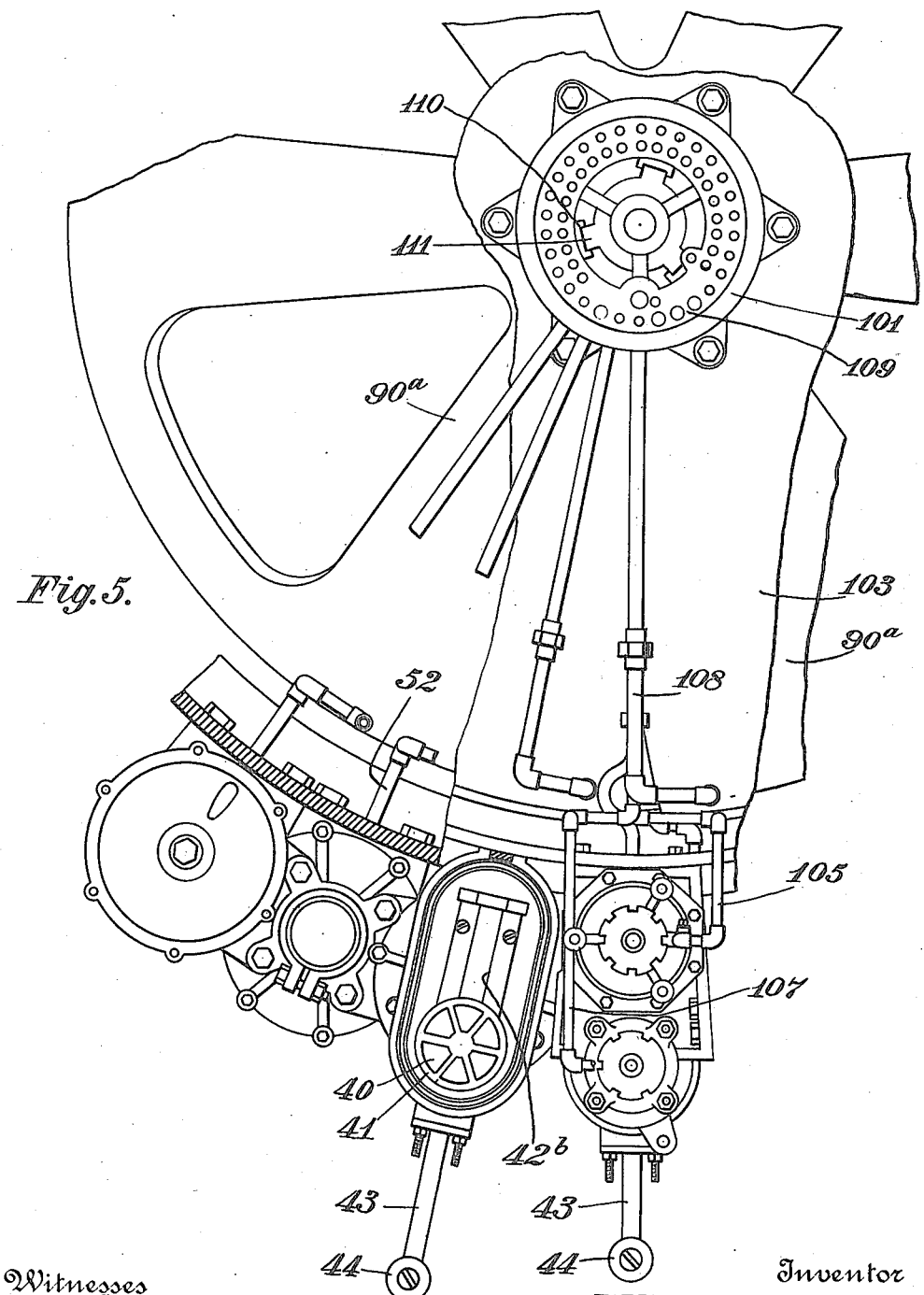

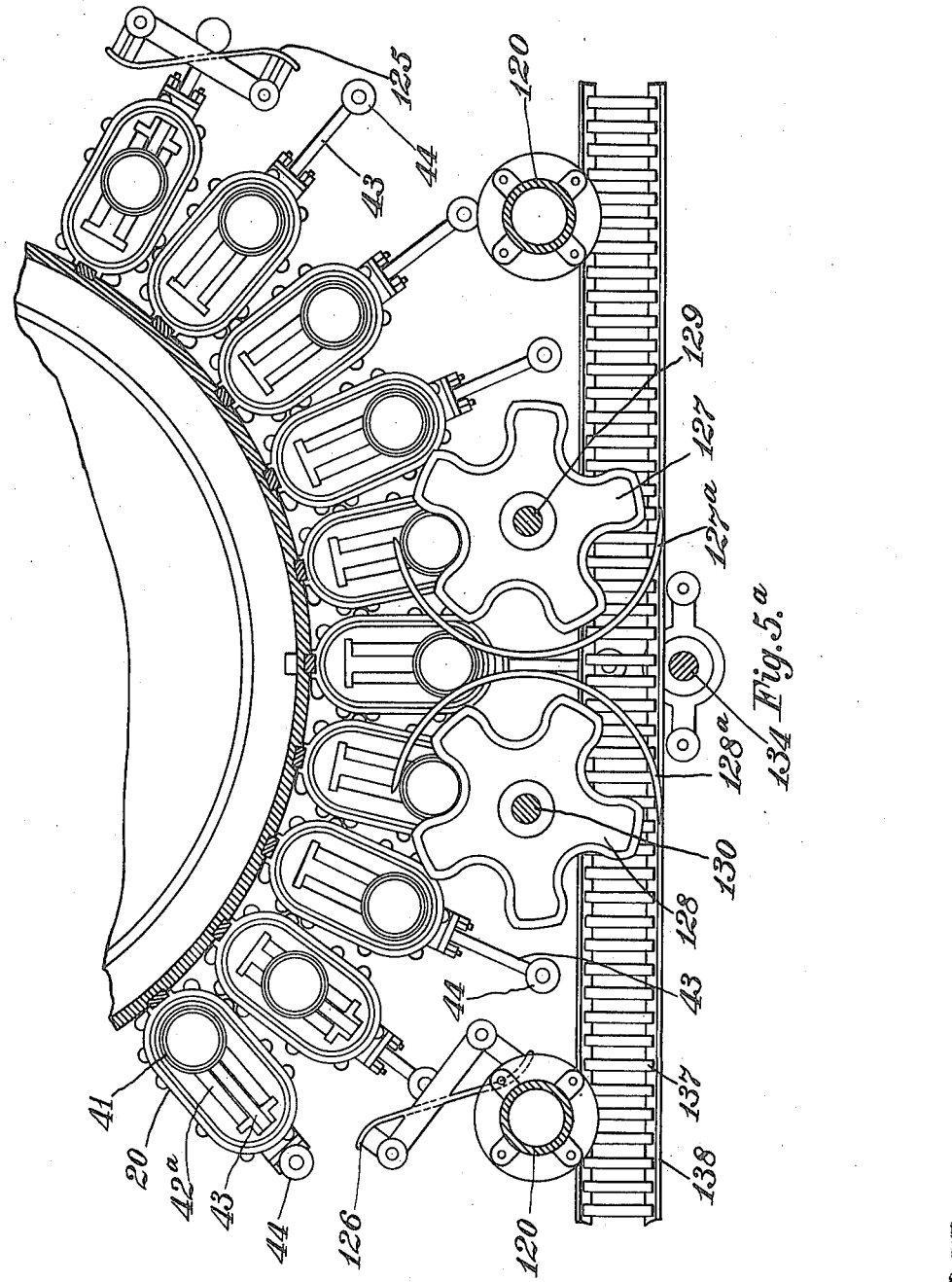

W. B. FENN.
PROCESS OF STERILIZING ORGANIC MATERIAL.
APPLICATION FILED OCT. 3, 1911.
1,141,242.
Patented June 1, 1915.
12 SHEETS—SHEET 7.
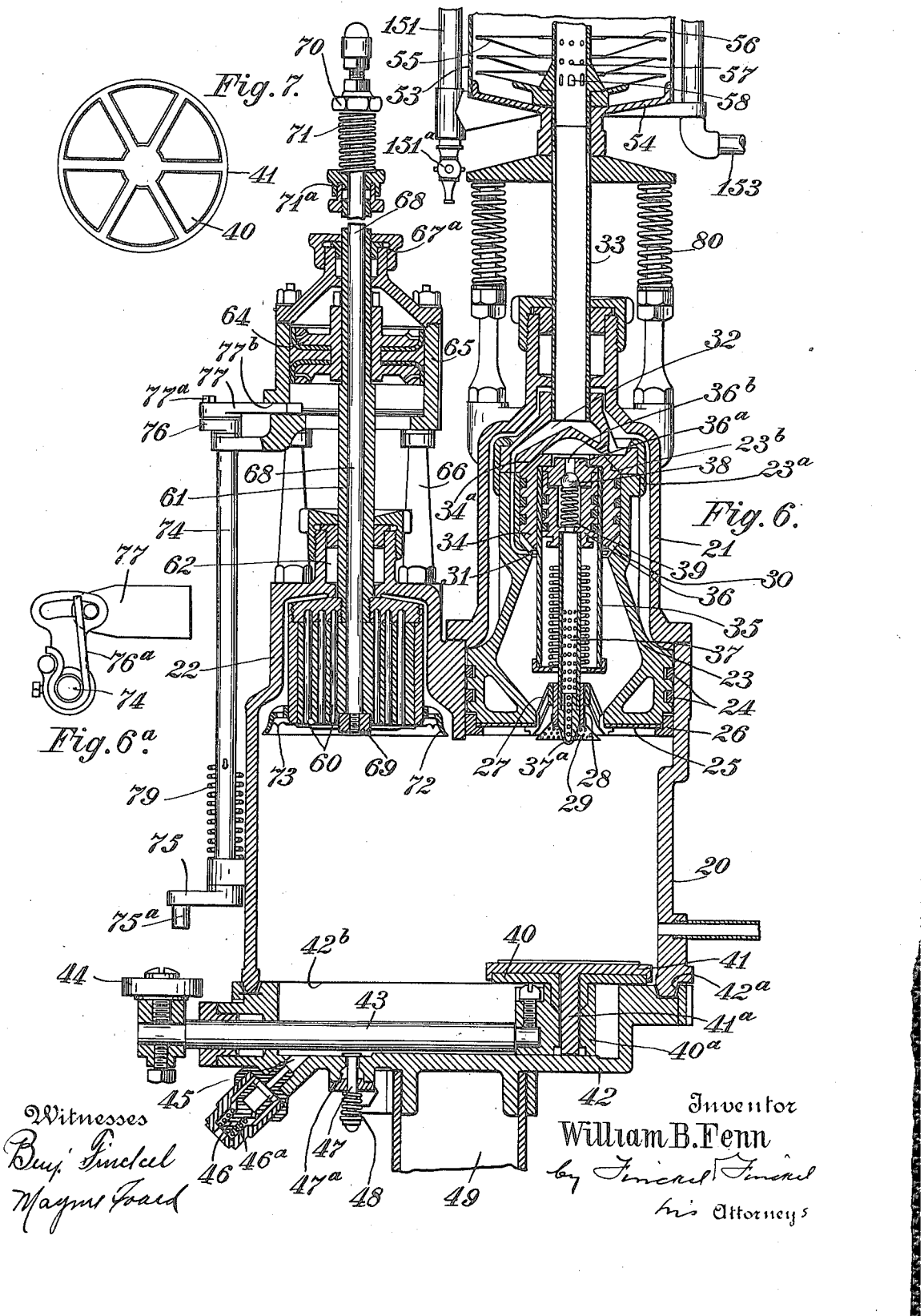
Witnesses
Benj. Finckel
Magnus Foard
Inventor
William B. Fenn
by Finckel & Finckel
his Attorneys

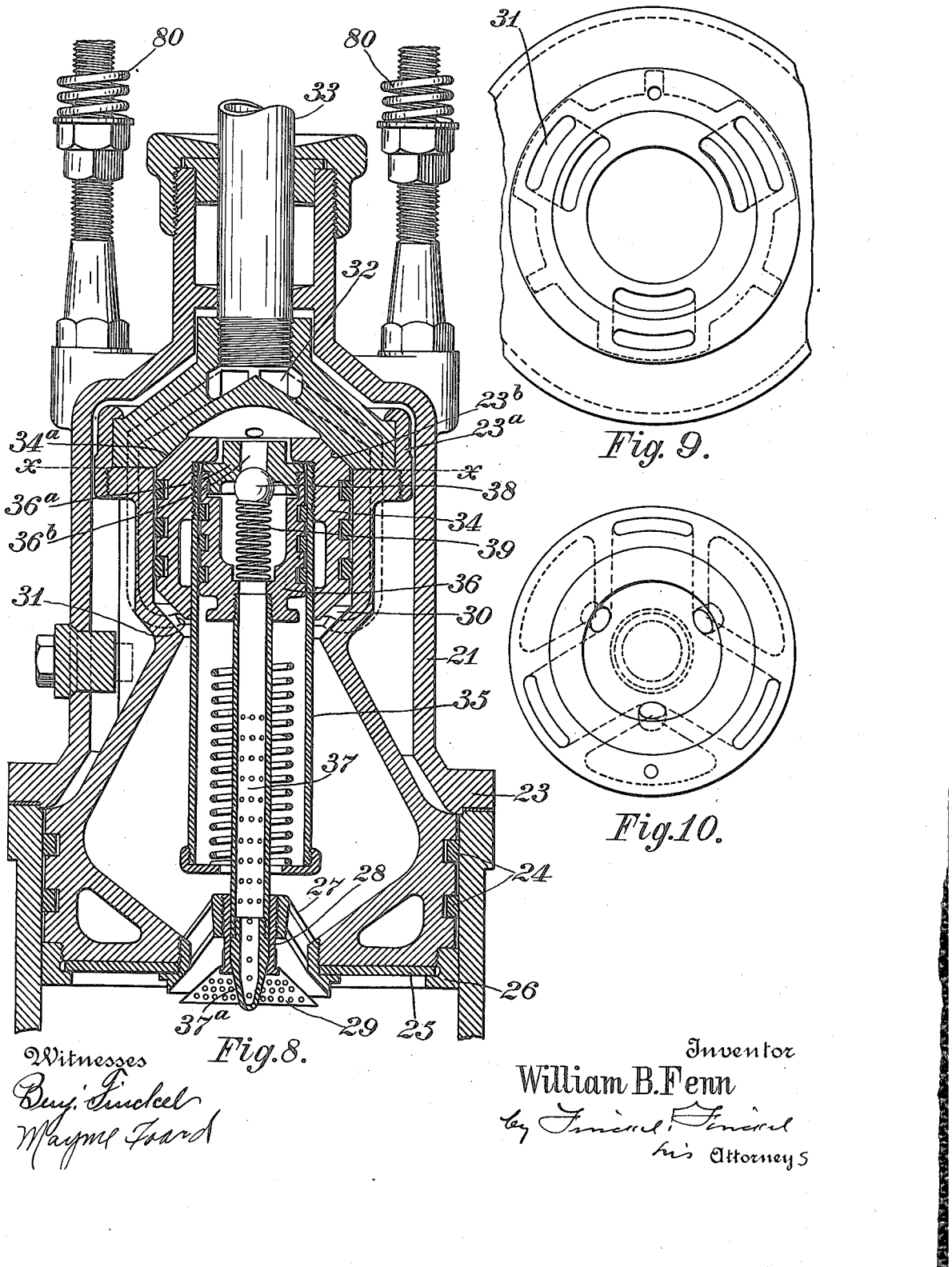

W. B. FENN.
PROCESS OF STERILIZING ORGANIC MATERIAL.
APPLICATION FILED OCT. 3, 1911.

1,141,242.

Patented June 1, 1915.
12 SHEETS—SHEET 9.

Witnesses
Benj. Finckel
Mayme Foard

Inventor
William B. Fenn
by Finckel & Finckel
his Attorneys

W. B. FENN.
PROCESS OF STERILIZING ORGANIC MATERIAL.
APPLICATION FILED OCT. 3, 1911.
1,141,242.
Patented June 1, 1915.
12 SHEETS—SHEET 11.
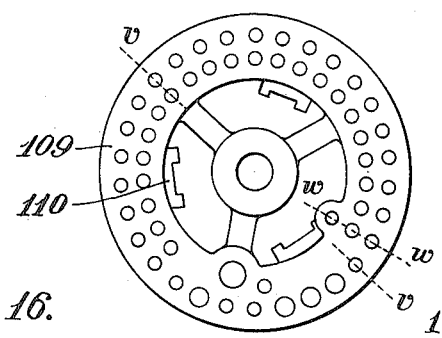
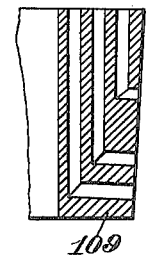
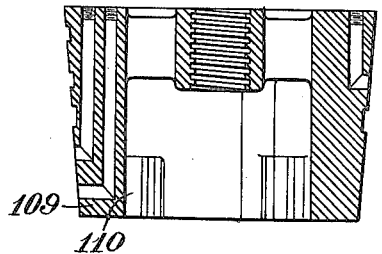
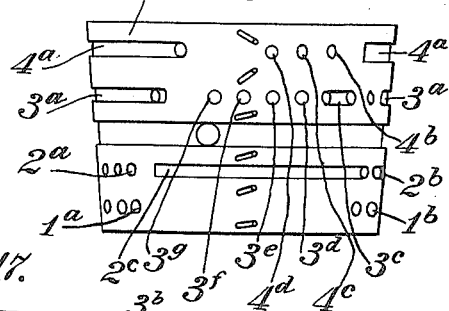
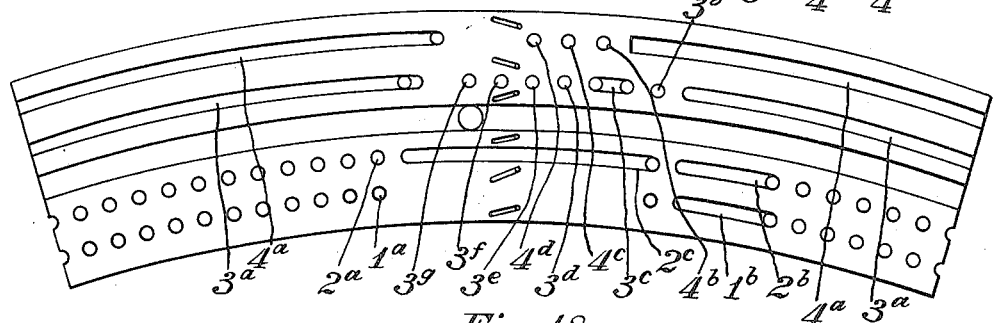
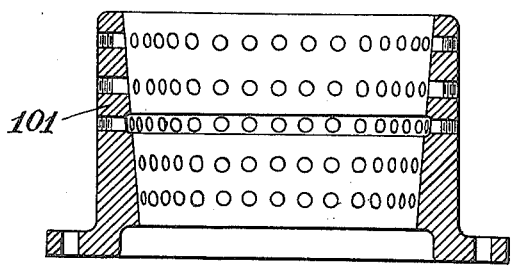
Witnesses
Benj. Finckel
Wayne Gaard
Inventor
William B. Fenn
by Finckel & Finckel
his Attorneys

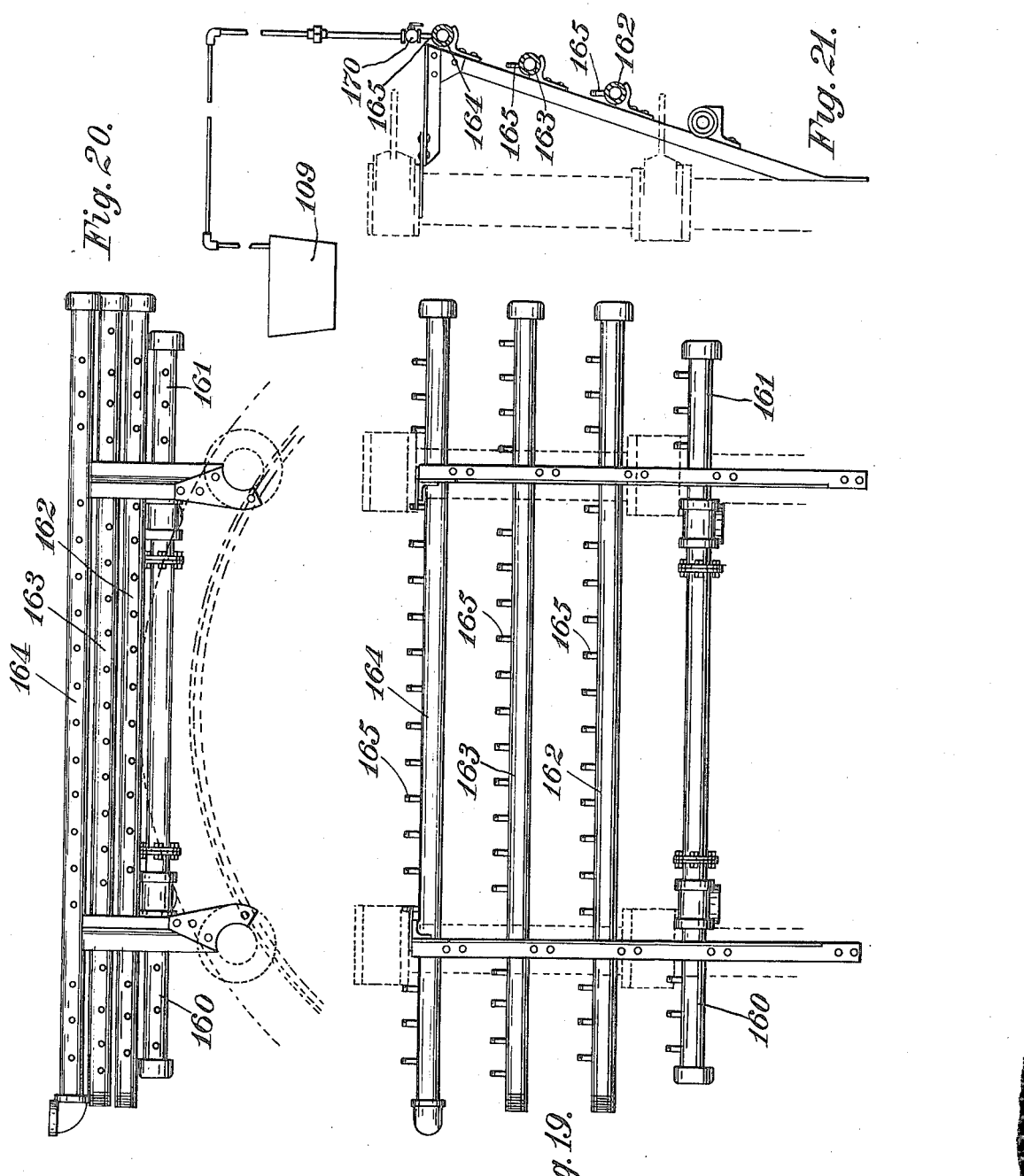

UNITED STATES PATENT OFFICE.

WILLIAM B. FENN, OF COLUMBUS, OHIO, ASSIGNOR TO THE WEDOIT COMPANY, OF COLUMBUS, OHIO, A CORPORATION OF OHIO.

PROCESS OF STERILIZING ORGANIC MATERIAL.

1,141,242.     Specification of Letters Patent.     Patented June 1, 1915.

Original application filed June 24, 1910, Serial No. 568,674. Divided and this application filed October 3, 1911. Serial No. 652,571.

*To all whom it may concern:*

Be it known that I, WILLIAM B. FENN, a citizen of the United States, residing at Columbus, in the county of Franklin and State of Ohio, have invented a certain new and useful Improvement in Processes of Sterilizing Organic Material, of which the following is a specification.

It is well understood that the putrefaction, fermentation or decay of animal and vegetable substance is due to the development and multiplication of spores, germs or micro-organisms of one or more sorts within or on the material, and I am informed that some such spores, &c., are present in the interior of the materials, even while the latter are in their natural and healthy or normal state, such spores, &c., being in a dormant or inactive state, but ready for development and multiplication or activity in course of time and upon the occurrence of proper conditions therefor. It is common household and factory practice, in a general way, to apply heat to such materials for the purpose of destroying or disabling such spores, &c., and then isolating the material by sealing or confining it in a tight vessel so as to exclude air and prevent contact with other possible sources of infection. Steam has heretofore been proposed as a convenient gas or vehicle for applying the heat, and in my present invention I prefer to use that vehicle. It is also well understood that some foods or perishable materials are of harder or closer texture than others and are therefore less permeable with gas than others.

The object, generally of this invention is an improved process for the rapid and thorough sterilization of perishable materials or things—especially foods.

One feature of the invention is embodied in subjecting the material to be sterilized to the heat of steam or other suitable vehicle under pressure in a tightly sealed vessel.

Another feature consists in subjecting such material to a succession of puffs of the sterilizing agent.

A third feature consists in graduating or varying the force or power of the applications of the sterilizing medium.

A fourth feature consists in adapting the applications of the sterilizing medium to the nature of the material to be treated.

Other features will appear from the following description and claims.

In carrying out my process I employ a machine such as shown in the accompanying drawings and set forth in the following description but it may be practicable to carry out the process in the whole or in part with other and different forms of machine.

Figure 12:
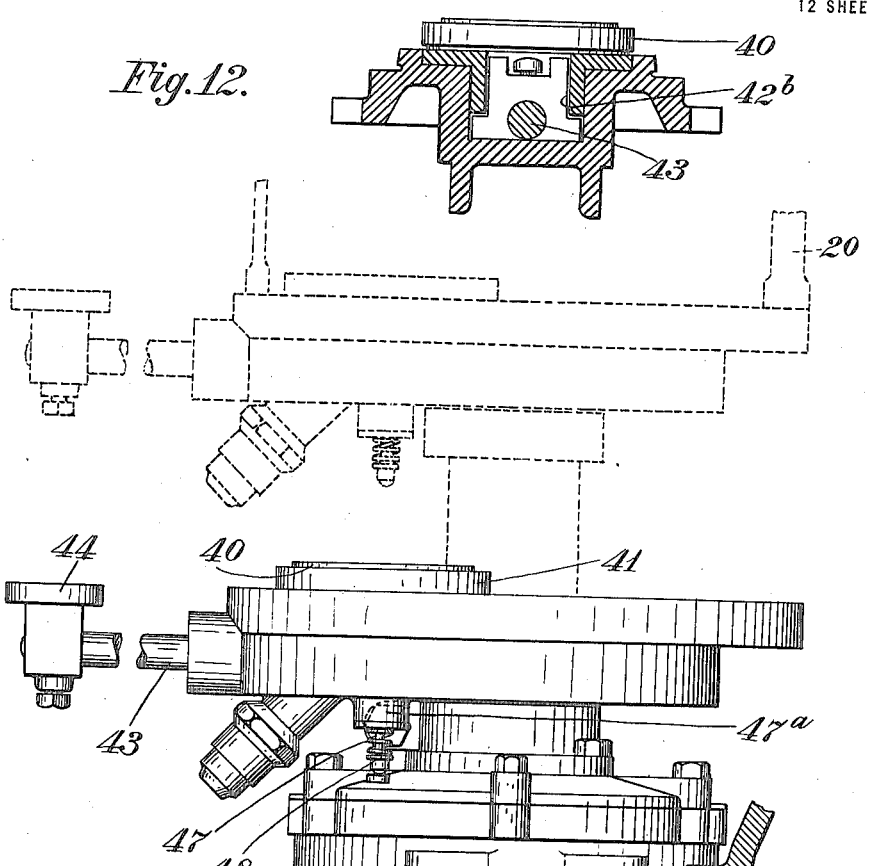
Figure 11:
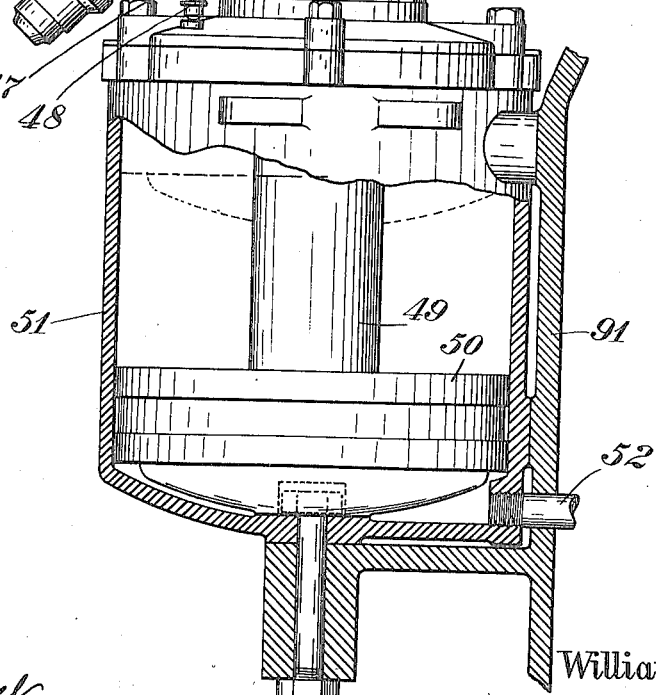
Figure 13:
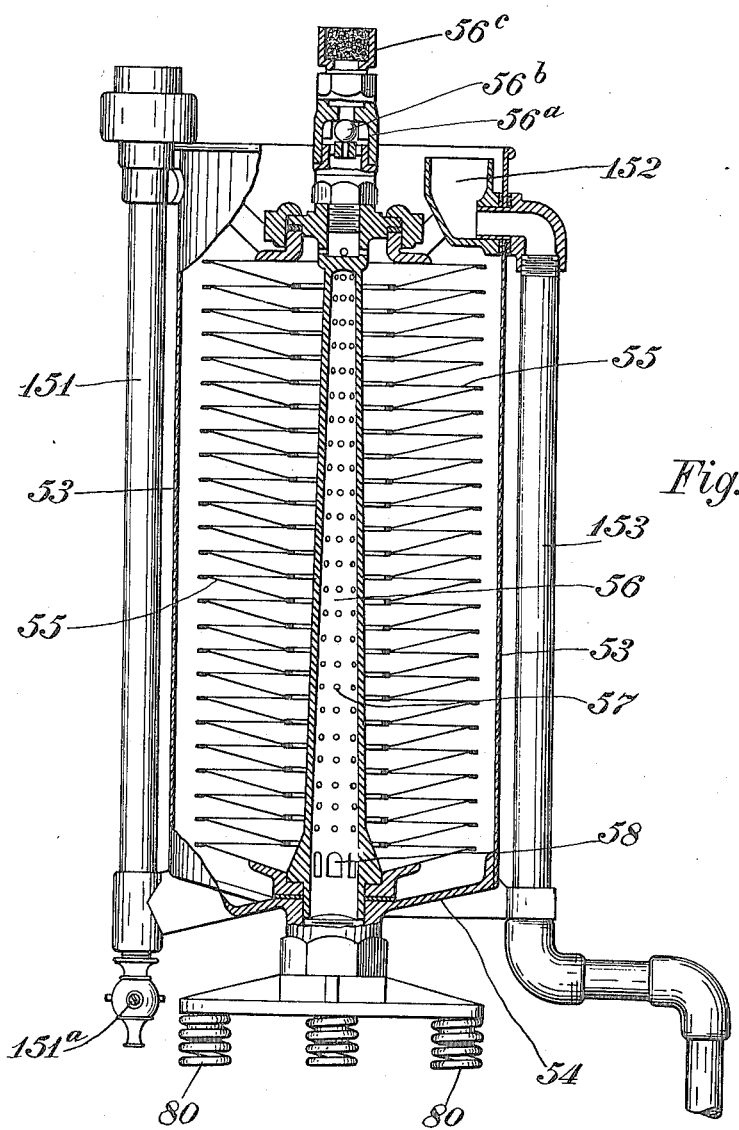

In said drawings: Figure 1 is a general view in elevation of the front or feeding and discharging side of the particular machine referred to. Fig. 2 is a similar view looking toward the right hand side of the machine with parts in section. Fig. 3 is a detail view on a larger scale of what is shown in Fig. 2 with parts omitted to illustrate piping. Fig. 4 is a plan view of the forward portion of the machine. Fig. 5 is mainly a plan view on a larger scale of a section of the machine to illustrate details. Fig. $5^a$ is a section of the forward part of the machine taken horizontally above the wheels for feeding and removing cans from the machine. Fig. 6 is a central vertical section of the cooking or sterilizing devices and capper taken radially of the machine. Fig. $6^a$ is a plan view of a modification of the device for operating the capper piston stop. Fig. 7 is a detail view of the can support that is shown in vertical section in Fig. 6. Fig. 8 is a central vertical section on a larger scale of the sterilizing or cooking head or piston. Fig. 9 is a plan view looking up at the lower end of the upper section of the said head or piston, the plane of said lower end being indicated at the line $x$—$x$ Fig. 8. Fig. 10 is a similar view at the same plane $x$—$x$ of the upper end of the lower section of said head or piston, the purpose of this view, as well as of Fig. 9, being to indicate the positions of the ducts in said head. Fig. 11 is an elevation and section on a larger scale than in the more general views to show details of the devices for supporting the can and for closing the receiver and forming the treating chamber. Fig. 12 is a vertical section of the receiver closer showing the can support therein and its guide. Fig. 13 is mainly a central vertical section of the condenser that communicates and coöperates with the treating chamber. Fig. 14 is an elevation of one side of the main or central valve. Fig. 15 is a plan view of the upper end of said valve.

Fig. 16 is a vertical section of the same on the line v—v Fig. 15. Fig. 16ª is a section on the line w—w Fig. 15. Fig. 17 is a diagrammatic development in a plane of the outer side of the central valve or plug member. Fig. 18 is a vertical section of the casing for the aforesaid valve, the plug valve being normally stationary and the collar or seat revolving around the plug. Figs. 19, 20 and 21 are an elevation, plan and vertical section respectively of the headers or manifolds through which the treating and operating fluids are passed, suitable pipes to be employed to connect said headers or manifolds with the proper passages and ports of the central plug valve.

In the views the receiver is shown as formed by a main shell 20 of nearly elliptical cross section horizontally. The upper portion of the shell 20 is furnished with two smaller extensions or shells 21 and 22, the former to receive the steam injecting devices and the latter to receive the can capping device. The shell 21, in conjunction with a portion of the main shell 20, constitutes in effect a cylinder in which the main head or carrier 23 of the steam treating devices reciprocates or moves like the piston of an ordinary steam engine. This head is a chambered structure and is provided at the exterior of its lower end with suitable packings 24 and on its lower end with flat rings 25 of rubber or other suitable packing material held in place by a metal ring 26 threaded onto the lower end of the head. The head 23 has a central opening at its lower end into which is threaded a spider 27; and the central portion of the latter has threaded into it a thimble 28 on which slides a petticoat strainer 29 designed to strain fluids of their contained solids tending to pass into the head, but permitting the free drainage of the head when pressure is relieved. The head 23 is conveniently made of two sections joined by a coupling ring 23ª. The lower section of the head is bored at its upper end to cylinder form but it is provided with an inwardly converging seat 30, opening at which are ports of several ducts or passages 31 leading upward through the head to a cavity 32 in the upper section of the head. Threaded into the upper section of the head is a tubular connecting pipe 33 that establishes communication of the cavity 32 (and therefore of the interior of the head 23) with the condenser or cooler to be hereinafter more particularly described.

Within the bored chamber in an upper portion of the head 23 is a valve 34 suitably packed on its exterior to work in said chamber. The lower end of this valve 34 is formed to fit the seat 30 or so as to be adapted to open and close the ports thereat to the ducts 31. The upper end of the valve 34 is beveled and ground at 34ª to fit on a ground seat 23ᵇ to aid in making a tight joint between those parts when the piston is up. The valve 34 has an axial through opening, and threaded into said opening is a tube 35 that projects into the chamber below; and said tube constitutes a cylinder in which reciprocates a piston 36 provided with suitable packings on its exterior to make a steam-tight fit in the tube. The lower end of the piston 36 is furnished with a perforated nozzle or teat 37 that passes through the thimble 28. The nozzle 37 is shown as threaded at its upper end into the piston 36, and the lower end of the nozzle is furnished with a tapering tip 37ª securely fastened thereto. The thimble 28 in connection with the spider 27 serves to assist in guiding the nozzle 37 in its reciprocations. The nozzle 37 is made of such length that when projected downward as far as may be it will extend nearly or quite to the bottom of the can containing the material to be treated as hereinafter described. The nozzle is made with many perforations in its sides so that steam under pressure therein may be projected laterally or radially practically in all directions into the surrounding material. The upper end of the piston 36 has threaded into it a cap 36ª (or this cap may be said to form a section of the piston) provided with a port 36ᵇ and in the cavity of the piston below the port is a ball valve 38 yieldingly held by a coil spring 39 against the cap to close the port.

The device upon which the can is supported while its contents are being subjected to treatment is best illustrated in detail in Figs. 6 and 7. In these views 40 designates the main support which sustains the can when in position under the treating head, said support 40 being threaded into a shank 40ª, but associated with this main support is an auxiliary support comprised of a grid or pad 41 having a level top, and provided with a shank 41ª extending into a through hole in the shank 40ª of the main support. The main support is recessed at its upper side to receive the center portion and radial bars of the grid and permit them to sink below the level of the top of the main holder, which latter then extends into the hollow bottom of the can and retains the can in proper position. A support of different height and diameter can be substituted for that in the machine to adapt the device to receive a different height or diameter of can. The can support is mounted on the receiver closer 42 which, in the instance shown, is of a form and size to fit under and close the lower open end of the receiver or treating chamber 20.

The receiver closer can be provided with a suitable guide 42ᵇ in which the can support travels. To make the closure gas or steam tight the receiver closer is made with a groove 42ª into which the lower edge of the receiver projects, the bottom of the groove being shown as furnished with a suitable packing to lie between the meeting parts to make the junction properly tight. The can support has suitably connected with it a rod 43 that extends horizontally through the rim of the receiver closer and to the exterior thereof, so that the can support can be transferred from its place under the capper to its place under the treating head, and reversely, while the receiver-closer is shut against the receiver. The outer end of the transfer rod 43 is furnished with an antifriction roller 44 to work against suitable cams formed to move the can support inward or outward at the proper time as the treating chamber or receiver rotates in its orbit about the center of the machine as hereinafter set forth. Where the rod 43 passes through the receiver closer the latter is provided with a suitable stuffing box of ordinary construction. The receiver-closer is provided with a port 45 adapted to be normally opened by a suitable spring actuated check valve, as seen at 46, the spring 46ª actuating such valve being of such strength that the valve will be normally held off its seat to drain the receiver-closer. The receiver-closer is also provided with a pin 47, the head of which normally is held down on the upper side of the receiver-closer by a spring 48. The said pin 47 projects through to the exterior of the under side of the receiver-closer and it is located under the point where the shank 41ª of the can supporting grid stops when the latter is moved to its place under the capper, and said pin when stopped by a stationary part below obstructs the downward movement of the shank 41ª and detains the grid and can and separates the latter from the support proper 40, thus rendering the sliding of the can thereon or thereoff in a horizontal direction easy. The pin 47 works in a suitable stuffing box as shown at 47ª. The receiver-closer is shown as supported on and strapped to the end of the rod or tube 49 of a piston 50 (see Fig. 11) that works in a cylinder 51, the latter traveling in an orbit around the vertical center of the machine with the receiver.

52 is a pipe for admitting fluid pressure to the under side of the piston 50 and when pressure is so admitted the receiver closer is shoved up tightly against the open end of the receiver. In the instance shown the receiver-closer is lowered by exhausting the pressure below the piston, but there are numerous expedients for operating the closer that will promptly occur to those skilled in such matters.

The position of the condenser in the machine is best shown in Figs. 3 and 6, but the details of its construction are best shown in Fig. 13. The character 53 designates the outer shell or cool water vessel of the condenser. The lower end of said vessel is in the form of a stout head 54 that is centrally threaded to be secured to the threaded upper end of the connecting pipe 33. Arranged within the vessel 53 is the condenser proper 55, which, as shown, is made up of series of circular obtuse frusto-conical and flat plates alternately occurring and preferably of copper or brass, perforated at their centers and fluid-tightly seamed together at their inner and outer edges respectively so as to form an accordion-like chamber having an axial opening. Extending through the said axial opening is a tapering pipe 56 with numerous spraying holes 57 arranged to direct fluid passing through them into the circumjacent recesses of the condenser. The pipe 56 is made tapering upward so as to secure a nearly equal distribution of the vapors or fluids rising into it by pressure or otherwise from the cooking head. The tapering pipe 56 is connected with the head 54 to form a continuation of the tube 33 so that fluids discharged into the latter are projected into the former. Large holes 58 at the lower end of the pipe 56 serve to permit the rapid return of fluids condensed or otherwise to the cooking head and the can or vessel from which they arose. The tapering pipe 56 has added to its upper end a suitable casing 56ª containing a check valve 56ᵇ of ball form; and beyond the said valve is a cup 56ᶜ containing a wad of antiseptic filtering cotton so that the condensed vapors may be replaced by sterilized atmospheric air. The head or carrier 23 is relieved of the weight of the condenser by means of springs 80 adjustably interposed between the condenser and the shell 21. The springs in practice can be adjusted so that the head 23 may promptly respond to upward pressure in the treated can when the space above is vacuumized.

The can capping device or head comprises three concentric series of permanent magnets 60 suitably arranged but preferably alternately positive and negative in the several circles embedded in a suitable non-magnetic body working in the shell 22. The magnet or capping head has a hollow stem 61 extending through a suitable stuffing box 62, and on the upper end of the hollow stem 61 is secured a piston 64 that works in a suitable cylinder 65 supported above the shell 22 by suitable posts 66, secured on the upper end of said shell. The upper portion of the cylinder 65 has connected to it a pipe 107 for admitting and exhausting fluid pressure. Pressure admitted to the upper side of the piston forces the magnet head down, and exhaustion of that pressure and vacuumization permits the piston to be forced upward by atmospheric pressure, the under side of the cylinder being open. The hollow stem 61 has a reduced extension upward through the head at the upper end of the cylinder 65, said head being provided with a stuffing box 67ª to make the connection gas tight. Passed through the hollow stem 61 and magnet head is a rod 68 having threaded on its lower end a nut 69; and threaded on its upper end is an adjustable nut 70, and below this latter is a suitable stuffing box 71ª to prevent the escape of pressure between the rod and tube. Between the stuffing box 71ª and the adjustable nut 70 is a spring 71 that tends to hold the rod 68 normally upward or with the nut 69 against the capping head. Threaded on the lower extremity of the magnet head 60 is an annular flared ring 72 of a diameter suitable to receive the cap 73 for the can. Any form of ring suitable for the diameter and form of can used can be employed.

Pivoted in suitable ears on the outer side of the receiver 20 is a vertical shaft 74 having at its lower end a horizontal crank arm 75 with a vertical pin 75ª; and at its upper end a horizontal crank arm 76 to which is pivoted at 77ª a stop member 77 that slides through a slot 77ᵇ in the lower end of the cylinder 65 below the piston therein. The shaft 74 can be actuated at the proper time by a spring 79 to pull the stop out to remove it from the path of the piston, and the stop is held normally under the piston by a circular stationary cam 78, the function of said stop being to prevent the descent of the capping head sufficiently to cap the can except at the proper time and to limit the descent of the head to the point where it will pick up the cap. A modification of the stop operating device is shown in Fig. 6ª, in which case the stop is moved by a spring arm 76ª so that should the shaft be forced when the stop is out and the piston down the shaft will yield. When the stop is removed from under the piston the capping head is free to descend to place or force the cap on the can as hereinafter described. The stop 77 is located at such a point and the magnet head is of such strength that when the piston 64 is at position where the magnet is stopped by the stop it is capable of lifting a loosely placed sheet metal cap off the can, but where the piston is at points above the stop it is incapable of removing the can cap. The form of the annular flaring ring is such that the cap is centered on the face of the magnet and in proper position to be shoved into an open can when the latter with its treated contents has been drawn to position under the magnet head.

The parts which have thus far been particularly described, or more especially the receiver and its appurtenances, and the closer for the same and its appurtenances, which may be said to constitute a unit, can be multiplied and arranged in a series, and so that they can, with suitable mechanism, be successively and automatically operated; and the material to be sterilized or otherwise treated can, in each receiver, be subjected to a series or succession of treatments, or the treatment given in some of them and not in others, as the conditions may require. It is preferred and it is shown that said parts are arranged in a circular series and to rotate about a common vertical axis, and said axis can contain suitable valve devices with pipes or conductors for distributing from a common source or from several suitable sources or exhausting as may be desired the treating and operating fluids or pressures.

In the instance shown the main supporting structure comprises a suitably constructed stationary base 90 from which is erected a conical frame 90ª. Supported on the base and with an interior dome piece 103 having a bearing at the apex of the cone is a rotating drum 91. To reduce friction the drum can rest and travel on ball bearings 92 located in a suitable race, as seen at 93. The lower edge of the drum is provided circumferentially with a crown gear 94 engaged by a pinion 95 fixed on the end of a shaft 96 horizontally journaled in suitable stationary bearings at the base of the frame. The shaft 96 can be driven by suitable power applied to a gear wheel 97 at the outer end of the shaft.

The receivers 20 with the parts attached thereto are supported around the upper portion of the drum by suitably bolting each receiver body to the drum. In the present instance the receivers—thirty in number—are arranged in a circle in the same horizontal plane, they being equally spaced apart around the top of the drum. The cylinders 51 containing the pistons for elevating and depressing the receiver-closers are each secured by suitably bolting it to the drum vertically below the receiver. These cylinders 51 are of such large size in the instance shown that it was necessary to place them in staggered arrangement—one up and the next down. There is one of the cylinders 51 for each of the receivers, and where the stem 49 is elongated by reason of the low position of its cylinder 51, and it is desired or advantageous to provide means against which the pin 48 can abut when the receiver closer descends to effect the separation of the auxiliary support 41 from the main holder, there can be supported between the two adjacent higher cylinders 51 a suitable bridge to serve as the abutment.

As before stated, the treating and operating agents are supplied and distributed through suitable centrally located distributing devices of the nature of a valve. 101 designates the casing of such valve. The said valve casing is externally in the form of a cylinder with a downwardly tapering inner face constituting a seat for the valve plug or internal member. The valve casing is secured to the crown piece or dome 103 by suitable bolts, as seen at 103ᵃ. The casing rotates with the dome and drum. The wall of said valve casing is perforated horizontally to provide suitable ports, and the ports are threaded at their outer ends to receive the threaded ends of the pipes employed to conduct the treating and operating steam or gas to or from, or both, as the case may be, to the place or places where it is to be operative.

The scheme of piping between the valve casing and the parts to which the pipes lead is best depicted in Figs. 3 and 5 and is typical of that employed in each corresponding unit of the machine. In said view 104 designates the pipe for connecting the valve casing with the interior of the receiver; 105 the pipe for connecting the valve casing with the sterilizing or cooking devices; 106 is a pipe for conveying fuel gas to a suitable burner adjacent the receiver for preliminarily warming them. (Said pipes 106 and all the means and arrangements for supplying or using fuel gas as stated can be dispensed with without serious disadvantage.) 107 designates the pipe for supplying and exhausting pressure from the cylinder containing the piston that operates the capper. These several pipes are shown as made of two or more sections for convenience in directing them to, and for connecting with and disconnecting them from, the parts desired, suitable unions, elbows or couplings being used as the conditions may render expedient. At 102 can be a cock for controlling or regulating the passage of treating steam. Such a cock can be employed in each of the pipes at any suitable point. 109 designates the plug or stationary member of the central valve devices. The said plug member is of frusto-conical form or is downwardly tapering to fit or seat within the casing 101, and it is open through its center, its inner wall being provided with vertically grooved bosses 110 that engage vertical lugs 111 fixed at the apex of the conical frame 90ᵃ so as to prevent the plug from turning but permit it to be adjusted vertically to secure a satisfactory slipping steam tight fit between the plug and its seat in the casing (see Fig. 5). The upper end of the plug is of spider form with a hub or central portion that is threaded axially of the plug to receive the threaded end of a vertical feed screw 112. The screw 112 is held by suitable means longitudinally immovable in the vertical center of the machine and its lower end is furnished with a miter gear 113 engaged by a corresponding gear 114 on the inner end of a suitably journaled horizontal shaft 115, the outer end of which extends to a convenient point at the exterior of the machine where it is provided with a hand wheel 116 for turning it. By turning the said hand wheel 116 in the proper direction the plug can be raised or lowered and therefore moved toward or from its seat from time to time as may be wanted to improve the fit. The plug 109 is provided with passages ported around its periphery in zones corresponding to the zones of the ports in the casing, and for convenience in connecting the supply and exhaust pipes these passages are made angular so that the supply connecting terminals may be located in the upper or exposed end of the plug. In some cases as where a vacuum is to be exhausted the port can extend directly through the wall of the plug to the interior thereof.

The scheme of piping of the valve casing hereinbefore described being borne in mind and referring to Figs. 13 and 16 it will be noted from the drawings that the lowermost zone of ports of the plug principally supply the receiver exteriorly of the can when the material therein is being treated by steam under pressure equal to or nearly equal to that exerted within the can so as to prevent the bursting or collapse of the latter. Ports are provided in the same zone for exhausting the steam after the sterilizing treatment or as may be desired. It will also be observed that the second row of ports counting from the lower end of the said plug supply the treating steam. The treating steam and the aforesaid pressure equalizing steam can, of course be and preferably are, taken from the same original source or boiler, and the ports and cut offs between them stand in the same vertical plane so that the admission and cut off may be simultaneous. The middle port which supplies the fuel gas is shown to connect with a continuous annular groove because when fuel gas is used as described it should be supplied to all burners and kept supplied during the heating of the machine, the supply being turned on and cut off by a suitable ordinary cock beyond the plug 109. It will be further observed that the grooves and ports of the second zone from the upper end of the plug permit the application of air pressure to the piston for moving the magnetic capping head down. As said piston is shown as operated in the upward direction and held up for a considerable period of the cycle of movement air should be exhausted from the upper side of the piston so as to permit atmospheric pressure to keep it up. To accomplish this there is provided a long groove in the periphery of the plug at the same zone communicated with by a port that leads through a proper pipe to a suitable usual vacuumized chamber or vacuum pump not shown but well understood. The other ports in said zone which admit pressure and permit the exhaust thereof at the proper times for operating the magnetic capping head to take up the can cap, retain it, and then apply it to the can for closing or sealing it. It will also be observed that the upper zone of ports and grooves are for admitting pressure and permitting exhaust thereof to effect the raising and lowering of the receiver-closer and for holding it firmly against the lower end of the receiver during the period or periods of sterilizing treatment. So far as concerns the operation of the piston that carries the receiver-closer the operation of that member by artificial and atmospheric pressure through the ports and grooves of the uppermost zone is, generally speaking, like that of the piston of the magnet head. The small inclined grooves with the ports opening to them appearing along the middle of the periphery of the plug as shown in Figs. 13 and 16 are for the purpose of supplying a lubricant to the adjacent surfaces of the plug and its seat. All these last named ports and grooves can be supplied with lubricant through a vertical passage common to them, said vertical passage being in the body of the plug and opening at the top of the plug where a conductor from any suitable lubricant cup or reservoir, not shown but well understood, can be attached.

Secured on the base of the machine and beyond the orbits of the receivers and their closing devices is a suitable number of vertical columns 120 on which are secured circular horizontal beams 121 and 122. On the beam 122 is secured a flange or groove 78 for acting on the pin 75$^a$ to hold the stop 77$^b$ inward in position to limit the descent of the piston 64 and magnetic capping head. The spring 79 is designed to withdraw said stop 77$^b$ when the pin 75$^a$ leaves said flange, but its withdrawal can be effected or insured by a small outwardly inclined stationary cam 123 at one end of the flange, thereby permitting the descent of the capper when that operation is to take place. A cam similar to that designated 125 is provided at the other end of the flange or groove but inclined inward toward the flange and to be engaged by the pin 75$^a$ to turn the shaft 74 to throw the stop inward to position to limit the descent of the capper as before described. Also mounted on the beam 122 are flanges or rails 124 engaged by the roller 44 of the transfer rod 43 to hold the can support with a can thereon inward or under the steam-treating head. Suitable cams 125 and 126 having outwardly and inwardly inclined operative faces are provided, against which the rollers 44 are drawn for automatically causing the outward and inward movements of the transfer rod and can support to bring the latter member under the capper and remove it from that position respectively to below the treating devices. The withdrawals of the stop 77$^a$ and the rod 43 take place after the steam treatment has been completed and before the treated can reaches that point in the cycle where it is to be taken from the machine, and the pushing inward of said stop 77$^a$ takes place after the freshly filled untreated can is placed on the can support. The can support is left in its outer position to receive the can and is not pushed inward until after the capper has descended to pick up the can cap as before described.

The machine will be equipped with suitable means for automatically placing the freshly filled untreated cans, one by one, on the can supports, and likewise removing the treated cans from the supports as they arrive at the proper predetermined points in the cycle. For this purpose there are shown two wheels 127 and 128 deeply or appropriately recessed at their rims to embrace the can. The rims of said wheels turn adjacent to curved stationary guides 127$^a$ and 128$^a$ that insure the guidance of the cans onto and off the can support. The said wheels are fixed on vertical shafts 129 and 130 respectively mounted in suitable bearings on the beams 121 and 122. The said shafts 129 and 130 are provided at their upper ends with separated spur gears 131 and 132, respectively, and these latter are each engaged by an intermediate spur gear 133 secured on the end of a third companion vertical shaft 134 journaled on a suitable bearing 135 near the power shaft 96. The lower end of said shaft 134 has fixed to it a miter gear 136 that is engaged by a similar gear on the power shaft 96 whereby the intermediate gear 153 can be turned and hence impart rotary motion in contrary directions to the can feeding and removing wheels 127 and 128 respectively. The freshly filled, untreated cans are delivered to the wheel 128 and removed from the wheel 127 by means of a traveling endless conveyer belt 137. The upper part of the said belt travels on a way 138 while the lower part travels in ways 139 supported on columns 120 (see Fig. 2). Any suitable means (not shown) can be provided for automatically insuring the proper spacing of the cans on the belt prior to their arrival at the place where they are taken by the feeding wheel 128. The belt 137 is driven by means of a toothed wheel 140 fixed on one end of a shaft 141 suitably journaled horizontally on the machine, said shaft being driven by a sprocket chain 142 running over a sprocket wheel 143 fixed on said shaft 141 and a sprocket wheel fixed on a short counter shaft 144 driven by a pinion on the main power shaft 96 engaging a spur gear 145 on said short counter shaft 144.

The receivers and their closers and the parts thereto connected travel in the direction indicated by the arrows near them in Fig. 4 and the upper part of the conveyer belt travels in the direction indicated by the arrow near it in the same view.

The condensers are each kept cool by a flow of cool water from a circular trough-like tank 147 supported by posts 148 fixed on small brackets 149 at the inner side of the top of the drum (see Fig. 2). Connected with this tank 147 is a small spigot 150, one for each of the condensers, that discharge into a conductor 151, said conductor opening at its lower end into the lower end of the vessel 53. In the upper end of the said vessel 53 is an over-flow 152 that discharges through a pipe 153 into an annular collecting gutter 154 in the top of the drum. From said gutter the water is conducted by means of one or more pipes like that shown at 155 to the exterior of the drum near the base of the machine, and thence it may be again collected and allowed to run to a suitable drain. As the warmed water rises in and overflows from the chamber 53 it is replaced by cool water at the bottom from the aforesaid circular tank.

151$^a$ is a cock for draining the vessel 53 and conductor 151 when desired.

Referring now to Figs. 19, 20 and 21 in which are shown the headers interposed for connecting the upper end of the central valve or plug member 109 by means of pipes with sources of supply and exhaust. In said views 160 designates the header for connecting the pipe that supplies compressed air to the magnet cylinder; 161 the header for connecting the pipe through which a vacuum is created in the magnet cylinder and treating chamber; 162 the header for connecting the pipes that supply steam to the receivers externally of the treated cans; 163 the header for connecting the pipes that supply steam to the nozzle cylinder or cooking and sterilizing devices; and 164 designates the header through which steam or air exhausts are permitted or effected. The headers can be provided at their upper sides with ports having therein short threaded nipples, as seen at 165, for coupling the ends of the pipes thereto. It will be understood, of course, that the headers themselves can be connected by suitable conductors or pipes with sources of steam pressure or compressed air and with a vacuumized chamber or air pump, as the apparatus used may require. The headers are shown as arranged parallelly in horizontal position in different vertical planes, suitable brackets being secured to two of the columns 120, and the appropriate pipes can be extended from the headers upward, thence inward toward the vertical center line of the machine and finally downward to the appropriate port at the top of the central valve plug member 109, as exemplified in Fig. 20. Each of the pipes between the headers and the central valve can be provided with a suitable cock near the header as at 170, and the cock at 102 dispensed with if desired.

It is desirable to sterilize foods, especially meats, fruits and vegetables, with little or no disturbance of the natural cellular or fibrous structure and color of the material, so that the product, when exhibited in a glass vessel or exposed in an open opaque can, shall have nearly or quite the appearance it has in the natural state. This I have been able to accomplish for two reasons, first, because the application of the sterilizing steam can be primarily applied with extreme delicacy and then gradually increased in potency to the degree necessary for sterilization, and, second, because the steam is applied at the interior of the article or mass and made quickly to permeate the material. Because the material is treated in this way and also because it is not exposed in the treatment or before it is sealed, the natural flavors and aromas thereof are not conveyed away in vapors, but are retained in or with the treated material. The extent to which any particular material shall be treated is largely determined by the nature of the article itself. To effect the sterilization of an article in the present machine it is not necessary that the same shall be so far treated as to completely "cook" it as if to be prepared for the table, although any article can be so treated in the machine. The article can be but partly or slightly cooked, and such an effect necessarily takes place because of the involved application of sterilizing heat. In the sterilizing devices and process, therefore, steam under pressures ranging from about forty pounds up to one hundred and twenty five pounds to the square inch yielding temperatures ranging from about two hundred and eighty degrees up to about three hundred and fifty degrees Fahrenheit is preferably employed. All or most spores, germs, &c., are destroyed it is understood by a temperature less than the particular minimum one here suggested. At the start of the treating operation the materials in the cans are comparatively cold and because of this the treating steam injected in the first application is quickly condensed and the puff or jet is comparatively weak but as the material warms up by the successive treatments the puffs or jets become stronger, it being assumed, of course, that the admission valves are correspondingly set. But as the treating chambers pass from one port to another in the treating arc the new injections can be kept practically equal or be made of increased or diminished potency by a proper adjustment of the cocks that regulate the quantity of flow.

In operation the admission of steam pressure to the shell 21 first throws down the head 23, tightly closing the can, the large valve, 34, and then projects the perforated nozzle 37$^a$ into the goods contained in the can. The injection of the steam causes liquids and vapors to rise into the main piston or cooking head 23, and more or less cooling or condensation takes place between the puffs. The cutting off of the steam between the ports of the central or plug member 109 permits the ball valve 38 to rise and close the port 36$^b$. After the last treatment through the nozzle the vapors are caused or permitted to rise to the condenser where they are condensed and cooled and the liquids of condensation allowed to flow back to the can. This is brought about by the steam pressure being cut off above head 23, thus permitting the pressure in the can to raise valve 34 off its seat so that liquids and steam may pass up to the condenser and return after cooling or condensation.

Referring more particularly to Fig. 17 it may be stated that the freshly filled can with its closing cap loosely placed on the open end thereof is deposited on the can support of the receiver closer while the treating apparatus is opposite the region of the ports that open into the lubricating grooves. At this time the receiver closer is in its downward position with the under side of its operating piston open to atmosphere through a port 4$^d$, the capping head is elevated to its uppermost position by vacuumizing the cylinder above its piston through the port 3$^e$, and the treating nozzle and the associated valves and piston are up by reason of the action of a vacuum in the chamber 21 acting through the groove 2$^c$. As before indicated the movement of the treating devices is from right to left and the sequence of operations is as follows:

First, the capping piston is depressed to the stop to take up the can cap by the admission of air pressure to the capping cylinder through the port 3$^f$.

Second, the pressure performing this operation is then exhausted through the port 3$^g$.

Third, the receiver closer is then elevated by air pressure through the groove 4$^a$. Immediately after this the can is transferred to position under the treating nozzle.

Fourth, the groove 3$^a$ vacuumizes the capping cylinder and fifth, the ports 2$^a$ and 1$^a$ are simultaneously opened to admit steam to the treating nozzle and receiver externally of the can. The succeeding series of pairs of ports in the same zone with the said ports 2$^a$ and 1$^a$ continue intermittently to deliver puffs or impulses of steam to the treating nozzle and receiver while the pressure and vacuum of the grooves 4$^a$ and 3$^a$ respectively continuously hold the receiver closer and capping head elevated.

Sixth, the treating devices in due course arrive at the grooves 2$^b$ and 1$^b$, at which point the treating valves and receiver are exhausted of their steam and pressure and upon passing the line of the end of said grooves 2$^b$ and 1$^b$ the vacuum holding the capping the head is cut off, but the receiver closer is still held up by pressure through the groove 4$^a$.

Seventh, upon the arrival of the devices to the groove 2$^c$ the shell 21 containing the treating nozzle is vacuumized, causing all the valves and the nozzle to rise therein. At the same time atmospheric air is admitted to the capping cylinder through the port 3$^b$. Upon passing said port 3$^b$ the treated can is retransferred to position under the capping head.

Eighth, on arrival at the port 3$^c$ pressure is admitted to the capping cylinder and the can capped the stop having been removed from the path of the piston. Slightly beyond the line of the right hand end of the groove 3$^c$ the groove 4$^a$ terminates and pressure to the receiver closer piston is cut off, said pressure being exhausted to atmosphere by port 4$^b$.

Ninth, at the port 4$^c$ the receiver closer is positively depressed to its lowermost or can receiving position by vacuumizing its cylinder and tenth, simultaneously at ports 4$^d$ and 3$^e$ atmospheric air is admitted to the receiver closer cylinder and capping cylinder. And after this the described cycle of operations is repeated.

In the process thus described the material is subjected to a series or succession of puffs or impulses of steam radiating through the mass and tending to search and permeate the interstices completely and quickly in every direction. The number of treating chambers built in a machine can be varied or the number of such chambers used in treating a particular material can be fewer than those actually present in the machine by closing the steam supply to some of them—alternate ones for example—or the first or the last and one or more of either of these or both, according to the requirements of products to be treated. The cap, of course, is amply sterilized by the steam in the receiver and, it will be observed, is applied to the can while confined and in a sterilized condition.

While I have shown and described a circular series of treating and capping devices these are not necessarily arranged in such a series, and one only of the treating devices, with or without the capping device, can be used with some beneficial effect. The circular-series arrangement, however, promotes simplicity and compactness of construction, as well as speed and economy of operation. The treating devices can be made to travel at any desired speed, but I contemplate operating them so as to permit the treating and capping of from twenty thousand to thirty thousand cans during a working day of eight or nine hours.

Materials of the vegetable class are preferably treated and preserved in water containing a small modicum of salt or sugar in solution. Germs, &c., contained in the water are, of course, destroyed, or rendered innocuous by the treatment, and the salt or sugar aid in preventing reinfection. Meats can be preserved in their natural state, or, if previously cured by ordinary methods, they can be kept in pure and wholesome condition for a longer period than if merely wrapped or exposed by subjecting them to further treatment in my machine or by its process and kept in sealed vessels.

It will be seen that according to my process small cans or jars of food are placed one after the other on holders which are in a circular series around the machine, and that a series of jets of steam are introduced to the bottom, and through the center of the food mass in each vessel or can. The steam is highly heated—super-heated, and it is allowed to escape but for an instant. If its contact with the food were maintained more than an instant, the food would cook, and even burn. The steam is allowed to contact with the food for a fraction of a second. The steam is then automatically stopped. The minute quantity which was allowed to escape permeates through the vessel or jar and acts to kill the bacteria and germs, without cooking the food. After each jet of steam there is a period of time in which the temperature will drop. Then another jet of highly heated steam can be safely introduced. Then there is another cooling interval. And so on, six, eight, ten times around the circle. After the steam jet process is completed the can or vessel is still held in a tightly inclosed chamber, and the cap is applied before exposure to the air, thus avoiding the infection of the contact with outside germs or bacteria.

The application for this patent is a division of that filed by me June 24, 1910, Serial No. 568,674.

What I claim is:

1. The process of sterilizing a perishable material consisting in intermittently jetting a hot gaseous sterilizing agent into the body of the material.

2. The process of sterilizing a perishable material consisting in intermittently jetting with a plurality of radiating jets a hot gaseous sterilizing agent into the body of the material.

3. The process of sterilizing a perishable material which consists in placing the material in a series of relatively small containers and intermittently jetting a hot gaseous sterilizing agent into the bodies of material in the containers.

4. The process of sterilizing a perishable material consisting in subjecting the material to a succession of jettings of a hot gaseous sterilizing agent of gradually increasing effect.

5. The process of sterilizing a perishable material consisting in subjecting the material to a succession of jettings of a hot gaseous sterilizing agent of gradually increasing force.

6. The process of sterilizing a perishable material consisting in subjecting the material to a succession of jettings of a hot gaseous sterilizing agent of varying force.

7. The process of sterilizing a perishable material which consists in intermittently jetting into a body of the material steam at a temperature considerably in excess of the normally boiling temperature at atmospheric pressure.

8. The process of sterilizing a perishable material which consists in the placing of the material in a container, inclosing the open end of the container to prevent communication between the interior of the container and the atmosphere, and intermittently jetting a gaseous sterilizing agent under pressure into the material in the container.

9. The process of sterilizing a perishable material, consisting in placing it in a portable vessel, placing the vessel in a normally tightly closed receiver, closing the vessel against communication with the interior of the receiver, subjecting the material in the vessel to the action of a hot gaseous sterilizing agent introduced under pressure from a point exterior to the vessel, and in surrounding the vessel by a fluid heating agent under pressure in the receiver.

10. The process of sterilizing a perishable material consisting in placing the material in a container, inclosing the open end of the container to prevent communication between the interior of the container and the atmosphere, jetting a hot gaseous sterilizing agent under pressure into the material within the container, and simultaneously subjecting the exterior of the container to a pressure substantially the same as that within the container.

11. The process of sterilizing a perishable material which consists in placing the material in a container, inclosing the open end of the container to prevent communication between the interior thereof and the atmosphere, intermittently jetting a hot gaseous sterilizing agent under pressure into the material within the container, and intermittently applying pressure to the exterior of the container synchronously with the said jetting action.

12. The process of sterilizing a perishable material consisting in placing the material in a container, jetting a hot gaseous sterilizing agent into the body of the material, permitting the escape of liquid constituents from the container during the jetting action and collecting the said liquid constituents and returning them to the container.

13. The process of sterilizing a perishable material consisting in placing the material in a series of similar containers, successively subjecting the material in the several containers to jets of hot gaseous sterilizing agent, permitting the liquid and vaporous constituents of the material in the containers to escape during the action of the jets, collecting the said liquid and vaporous constituents and returning the said liquid and vaporous constituents to the container.

14. The process of sterilizing a perishable material consisting in placing the material in a series of similar containers, successively subjecting the material in the several containers to the action of jets of hot gaseous sterilizing agent, permitting the escape of the vaporous constituents from the containers, condensing the vaporous constituents and returning the said condensed constituents to the containers.

15. The process of sterilizing a perishable material consisting of placing the material in a series of similar containers, successively subjecting the material in the several containers to the action of jets of hot gaseous sterilizing agent, permitting the liquid and gaseous constituents of the said material to escape from the containers during the action of the jets, collecting the liquid constituents and returning them to the said containers and collecting and condensing the vaporous constituents and returning them in condensed form to the containers.

16. The process of sterilizing a perishable material, consisting in placing it in a portable vessel, placing the vessel in a normally tightly closed receiver, temporarily closing the vessel against communication with the interior of the receiver, subjecting the material in the vessel to the action of a hot gaseous sterilizing agent introduced under pressure from a point exterior to the vessel, in surrounding the vessel by a fluid heating agent under pressure in the receiver, and in permanently closing the vessel while surrounded by the heating agent in the receiver.

17. The improvement in the art of preserving organic food substances which consists in disposing relatively small masses of the substances in preserving vessels, inserting a super-heated steam mass into the interior of the organic mass, permitting relatively minute quantities of steam to escape successively in short, quick jets and to permeate the organic mass, cutting off each steam jet before the heat disintegrates the organic tissue, after each jet action, and permitting the temperature of the organic mass to lower while it is held in a sterile chamber.

WILLIAM B. FENN.

Witnesses:
DONALD W. KLING,
BENJAMIN FINCKEL.